(12) United States Patent
Petkovich

(10) Patent No.: US 11,704,395 B2
(45) Date of Patent: Jul. 18, 2023

(54) METHODS FOR AUGMENTED REALITY DATA DECRYPTION AND DEVICES THEREOF

(71) Applicant: JPMorgan Chase Bank, N.A., New York, NY (US)

(72) Inventor: Slobodan Petkovich, Hillsdale, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 724 days.

(21) Appl. No.: 16/556,339

(22) Filed: Aug. 30, 2019

(65) Prior Publication Data

US 2020/0143024 A1 May 7, 2020

Related U.S. Application Data

(60) Provisional application No. 62/754,969, filed on Nov. 2, 2018.

(51) Int. Cl.
*G06F 21/32* (2013.01)
*G06F 21/60* (2013.01)
*G06T 19/00* (2011.01)

(52) U.S. Cl.
CPC ............ *G06F 21/32* (2013.01); *G06F 21/604* (2013.01); *G06T 19/006* (2013.01)

(58) Field of Classification Search
CPC .... G06F 21/32; G06F 21/604; G06F 2111/18; G06F 21/60; G06F 21/602; G06F 21/6209; G06F 21/31; G06T 19/006; H04L 67/38; H04M 2203/359; G02B 27/01; G02B 27/017; G02B 27/0172
See application file for complete search history.

(56) References Cited

U.S. PATENT DOCUMENTS

| | | | | |
|---|---|---|---|---|
| 7,840,487 B2* | 11/2010 | Hatano | ................... | H04L 9/083 |
| | | | | 726/1 |
| 10,318,744 B2* | 6/2019 | Dow | ....................... | G06F 21/36 |
| 11,282,139 B1* | 3/2022 | Winklevoss | ........... | G06Q 40/04 |
| 2016/0103984 A1* | 4/2016 | Warrier | ............... | G06F 21/6245 |
| | | | | 713/186 |
| 2018/0293771 A1* | 10/2018 | Piemonte | ................ | G06T 11/60 |

FOREIGN PATENT DOCUMENTS

| | | | |
|---|---|---|---|
| JP | 2010118990 A | * | 5/2010 |
| JP | 2015166909 A | * | 9/2015 |
| KR | 20130134990 A | * | 12/2013 |

* cited by examiner

*Primary Examiner* — Richard A McCoy
(74) *Attorney, Agent, or Firm* — Greenblum & Bernstein, P.L.C.

(57) ABSTRACT

A method for performing data decryption upon data to be displayed on an augmented reality display device is provided. The method includes identifying a user of the augmented reality display device; obtaining access rights information that relates to the user; receiving a set of encrypted information; using the obtained access rights information to determine whether the user is authorized to access the encrypted information; when the user is so authorized, accessing a decryption key that is associated with the encrypted information; decrypting at least a portion of the encrypted information by using the decryption key; and displaying the decrypted portion of the encrypted information on the augmented reality display device.

14 Claims, 5 Drawing Sheets

METHODS FOR AUGMENTED REALITY DATA DECRYPTION AND DEVICES THEREOF

CROSS-REFERENCE TO RELATED APPLICATIONS

This application claims the benefit of U.S. Provisional Patent Application Ser. No. 62/754,969, filed Nov. 2, 2018, which is hereby incorporated by reference in its entirety.

BACKGROUND

1. Field of the Disclosure

This technology generally relates to methods and systems for displaying data on augmented reality display devices, and more particularly to methods and systems for decrypting data to be displayed on an augmented reality display device in near-real-time based on a determination that a user is authorized to access the data.

2. Background Information

An augmented reality display device provides a user with an interactive experience of a real-world environment where the objects that reside in the real-world are enhanced by computer-generated perceptual information, sometimes across multiple sensory modalities, including visual, auditory, haptic, somatosensory and olfactory. Conventional augmented reality display devices include optical head-mounted display devices that are designed in the shape of eyeglasses, such as, for example, Google Glass.

In some instances, a user may desire to access information that is sensitive, such that the user and/or a provider of the information would prefer to ensure that the information cannot be accessed by unauthorized individuals. One conventional way to protect such information is to encrypt the information and to provide authorized users with a means for accessing a decryption key that is usable for decrypting the encrypted information.

However, with respect to an augmented reality display device, there may be a difficulty in ensuring that a user of the device is an authorized user and facilitating the ability of the authorized user to access the encrypted information in a timely manner. Accordingly, there is a need to automate a determination that a user of an augmented reality display device is authorized to access sensitive data and to decrypt the data in a near-real-time mode.

SUMMARY

The present disclosure, through one or more of its various aspects, embodiments, and/or specific features or sub-components, provides, inter alia, various systems, servers, devices, methods, media, programs, and platforms for decrypting data to be displayed on an augmented reality display device in near-real-time based on a determination that a user is authorized to access the data.

According to an aspect of the present disclosure, a method for performing data decryption is provided. The method is implemented by at least one processor that is in communication with an augmented reality display device. The method includes: identifying, by the at least one processor, a user of the augmented reality display device; obtaining, by the at least one processor, access rights information that relates to the user; receiving, by the at least one processor, a set of encrypted information; using, by the at least one processor, the obtained access rights information to determine whether the user is authorized to access the received set of encrypted information; when a determination that the user is authorized to access the received set of encrypted information is made, accessing, by the at least one processor, a decryption key that is associated with the received set of encrypted information; decrypting, by the at least one processor, at least a portion of the received set of encrypted information by using the accessed decryption key; and displaying, on the augmented reality display device, the decrypted portion of the received set of encrypted information.

The identifying the user may include obtaining biometric data that relates to the user and using the obtained biometric data to identify the user.

The obtaining the biometric data may include scanning a retina of the user.

The obtaining the biometric data may include obtaining voice data that relates to the user. The using the obtained biometric data may include using a voice recognition technique with respect to the obtained voice data.

The obtaining the biometric data may include obtaining fingerprint data that relates to the user.

The method may further include scanning, by the at least one processor, bar code data that relates to the received set of encrypted information, and using the scanned bar code data to identify the decryption key that is associated with the received set of encrypted information.

The bar code data may include a Quick Response (QR) code.

The received set of encrypted information may include a printable document that includes a code that is usable for determining whether the user is authorized to access a decrypted version of the printable document.

The received set of encrypted information may include image data that includes a code that is usable for determining whether the user is authorized to access a decrypted version of the image data.

The received set of encrypted information may include streaming video data that includes a code that is usable for determining whether the user is authorized to access a decrypted version of the streaming video data.

According to another aspect of the present disclosure, a computing apparatus configured to implement an execution of a method for performing data decryption upon data to be displayed on an augmented reality display device is provided. The computing apparatus includes a processor, a memory, and a communication interface coupled to each of the processor and the memory. The processor is configured to: identify a user of the augmented reality display device; obtain access rights information that relates to the user; receive a set of encrypted information; use the obtained access rights information to determine whether the user is authorized to access the received set of encrypted information; when a determination that the user is authorized to access the received set of encrypted information is made, access a decryption key that is associated with the received set of encrypted information; decrypt at least a portion of the received set of encrypted information by using the accessed decryption key; and display, on the augmented reality display device, the decrypted portion of the received set of encrypted information.

The processor may be further configured to obtain biometric data that relates to the user and to use the obtained biometric data to identify the user.

The processor may be further configured to scan a retina of the user.

The processor may be further configured to obtain voice data that relates to the user and to use a voice recognition technique with respect to the obtained voice data to identify the user.

The processor may be further configured to obtain fingerprint data that relates to the user.

The processor may be further configured to scan bar code data that relates to the received set of encrypted information and to use the scanned bar code data to identify the decryption key that is associated with the received set of encrypted information.

The bar code data may include a Quick Response (QR) code.

The received set of encrypted information may include a printable document that includes a code that is usable for determining whether the user is authorized to access a decrypted version of the printable document.

The received set of encrypted information may include image data that includes a code that is usable for determining whether the user is authorized to access a decrypted version of the image data.

The received set of encrypted information may include streaming video data that includes a code that is usable for determining whether the user is authorized to access a decrypted version of the streaming video data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
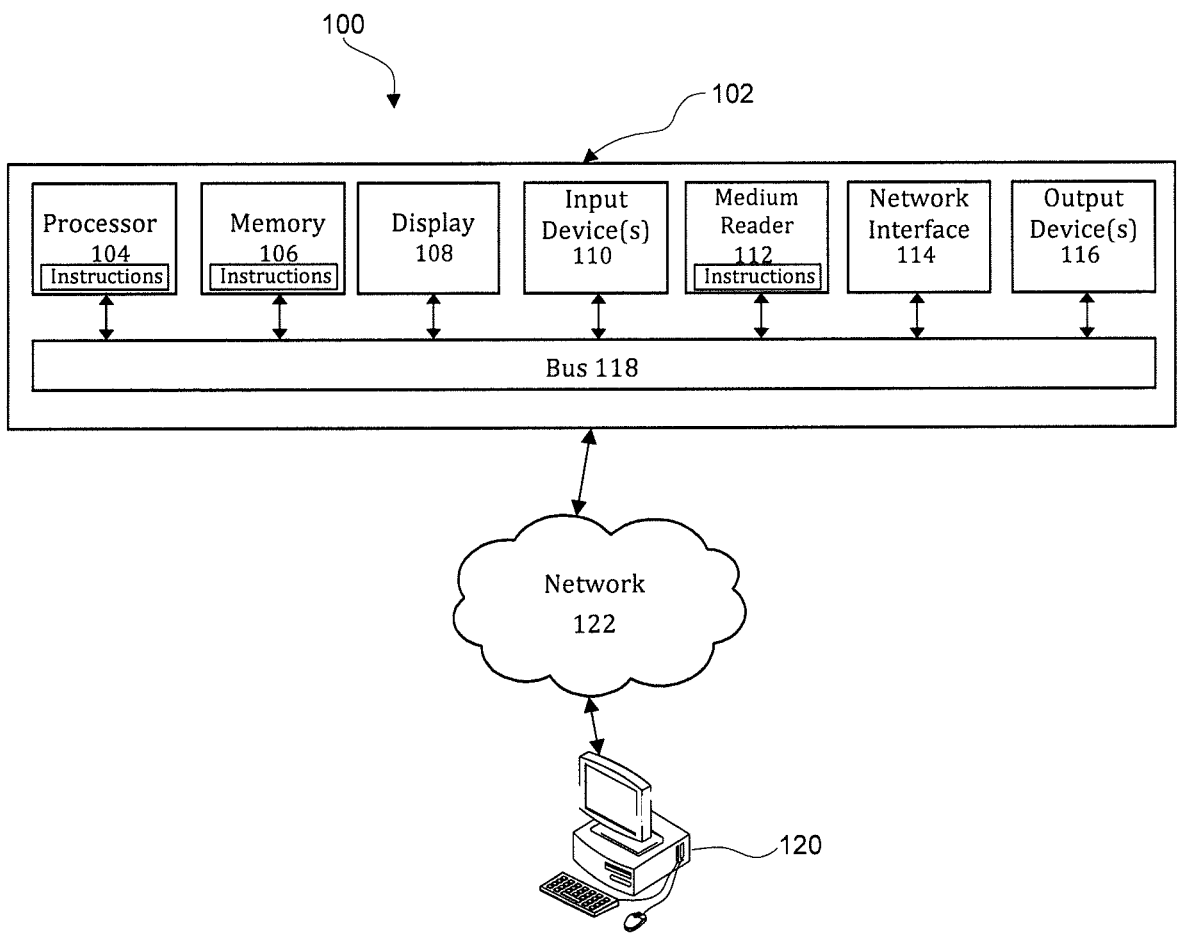
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for decrypting data to be displayed on an augmented reality display device in near-real-time based on a determination that a user is authorized to access the data.

Figure 2:
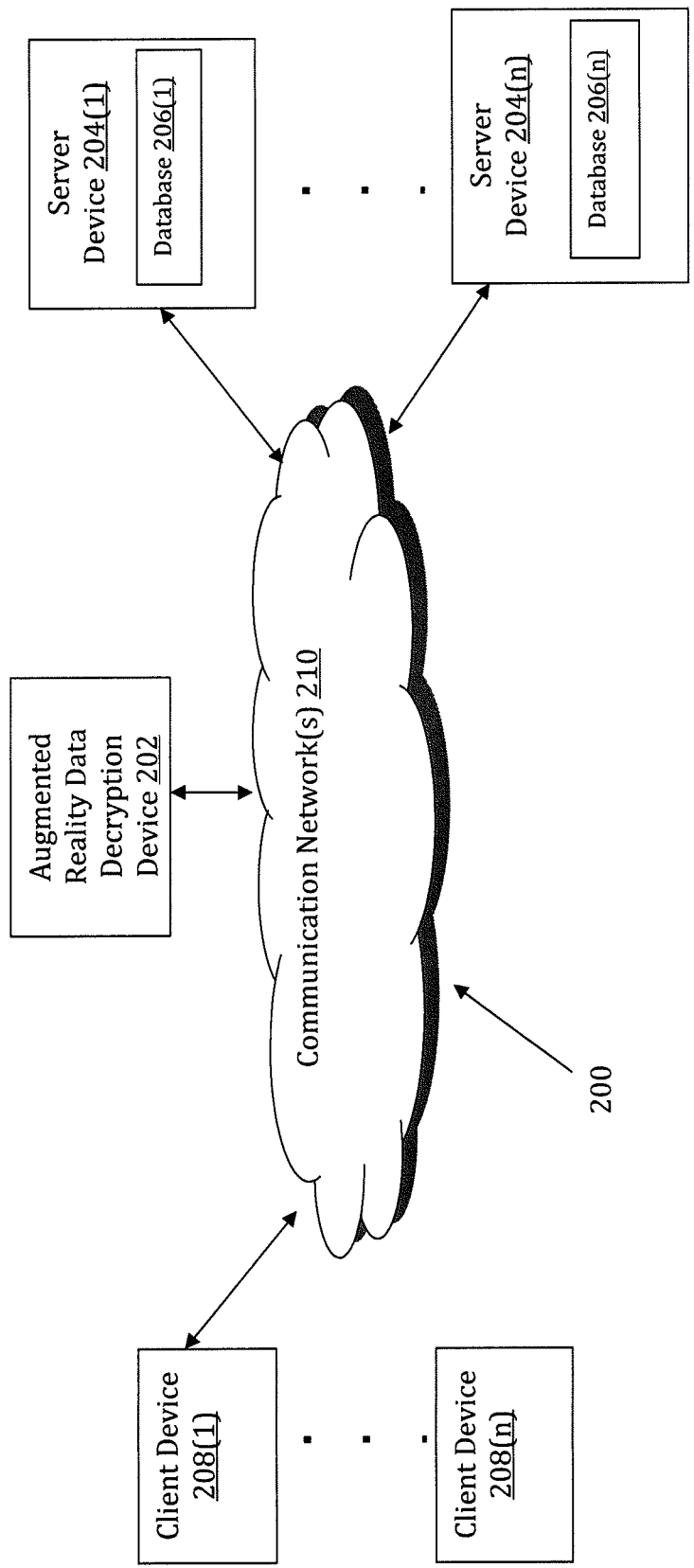
FIG. 2 illustrates an exemplary diagram of a network environment.

Referring to FIG. 2, a schematic of an exemplary network environment 200 for implementing a method for decrypting data to be displayed on an augmented reality display device in near-real-time based on a determination that a user is authorized to access the data is illustrated. In an exemplary embodiment, the method is executable on any networked computer platform, such as, for example, a personal computer (PC).

The method for decrypting data to be displayed on an augmented reality display device in near-real-time based on a determination that a user is authorized to access the data may be implemented by an Augmented Reality Data Decryption (ARDD) device 202. The ARDD device 202 may be the same or similar to the computer system 102 as described with respect to FIG. 1. The ARDD device 202 may store one or more applications that can include executable instructions that, when executed by the ARDD device 202, cause the ARDD device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ARDD device 202 itself, may be located in virtual server(s) running in a cloud-based computing environment rather than being tied to one or more specific physical network computing devices. Also, the application(s) may be running in one or more virtual machines (VMs) executing on the ARDD device 202. Additionally, in one or more embodiments of this technology, virtual machine(s) running on the ARDD device 202 may be managed or supervised by a hypervisor.

In the network environment 200 of FIG. 2, the ARDD device 202 is coupled to a plurality of server devices 204(1)-204(n) that hosts a plurality of databases 206(1)-206(n), and also to a plurality of client devices 208(1)-208(n) via communication network(s) 210. A communication interface of the ARDD device 202, such as the network interface 114 of the computer system 102 of FIG. 1, operatively couples and communicates between the ARDD device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ARDD device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ARDD devices that efficiently implement a method for decrypting data to be displayed on an augmented reality display device in near-real-time based on a determination that a user is authorized to access the data.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ARDD device 202 may be a standalone device or integrated with one or more other devices or apparatuses, such as one or more of the server devices 204(1)-204(n), for example. In one particular example, the ARDD device 202 may include or be hosted by one of the server devices 204(1)-204(n), and other arrangements are also possible. Moreover, one or more of the devices of the ARDD device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ARDD device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store user access management data, document data, source system data, and data that relates to encryption and decryption of sensitive data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ARDD device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ARDD device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ARDD device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ARDD device 202, the server devices 204(1)-204(n), or the client devices 208(1)-208(n), for example, may be configured to operate as virtual instances on the same physical machine. In other words, one or more of the ARDD device 202, the server devices 204(1)-204(n), or the client devices 208(1)-208(n) may operate on the same physical device rather than as separate devices communicating through communication network(s) 210. Additionally, there may be more or fewer ARDD devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
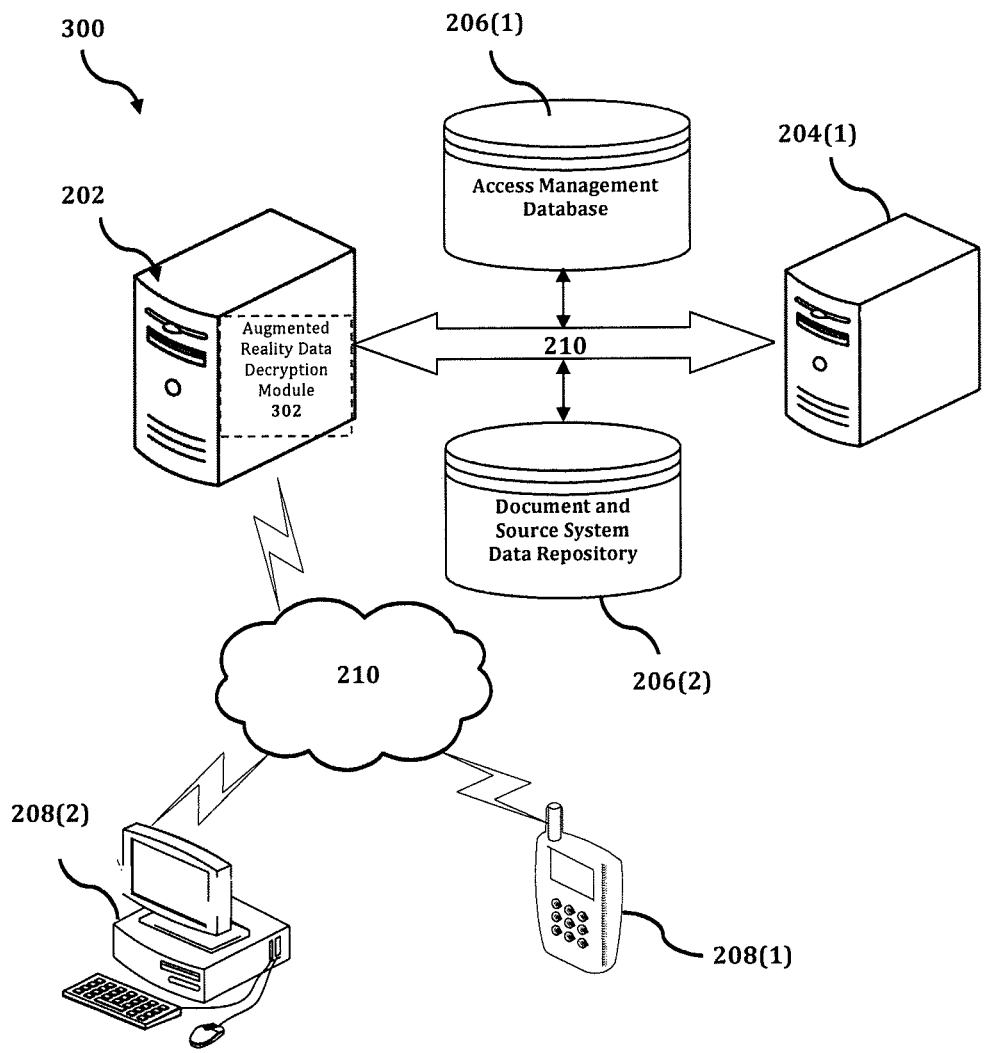
FIG. 3 shows an exemplary system for implementing a method for decrypting data to be displayed on an augmented reality display device in near-real-time based on a determination that a user is authorized to access the data.

The ARDD device 202 is described and shown in FIG. 3 as including an augmented reality data decryption module 302, although it may include other rules, policies, modules, databases, or applications, for example. As will be described below, the augmented reality data decryption module 302 is configured to implement a method for decrypting data to be displayed on an augmented reality display device in near-real-time based on a determination that a user is authorized to access the data.

An exemplary process 300 for implementing a mechanism for decrypting data to be displayed on an augmented reality display device in near-real-time based on a determination that a user is authorized to access the data by utilizing the network environment of FIG. 2 is shown as being executed in FIG. 3. Specifically, a first client device 208(1) and a second client device 208(2) are illustrated as being in communication with ARDD device 202. In this regard, the first client device 208(1) and the second client device 208(2) may be "clients" of the ARDD device 202 and are described herein as such. Nevertheless, it is to be known and understood that the first client device 208(1) and/or the second client device 208(2) need not necessarily be "clients" of the ARDD device 202, or any entity described in association therewith herein. Any additional or alternative relationship may exist between either or both of the first client device 208(1) and the second client device 208(2) and the ARDD device 202, or no relationship may exist.

Further, ARDD device 202 is illustrated as being able to access an access management database 206(1) and a documents and source system data repository 206(2). The augmented reality data decryption module 302 may be configured to access these databases for implementing a method for decrypting data to be displayed on an augmented reality display device in near-real-time based on a determination that a user is authorized to access the data.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein. In an exemplary embodiment, a client device 208 may include an optical head-mounted display device that is designed in the shape of eyeglasses.

The process may be executed via the communication network(s) 210, which may comprise plural networks as described above. For example, in an exemplary embodiment, either or both of the first client device 208(1) and the second client device 208(2) may communicate with the ARDD device 202 via broadband or cellular communication. Of course, these embodiments are merely exemplary and are not limiting or exhaustive.

Upon being started, the augmented reality data decryption module 302 executes a process for decrypting data to be displayed on an augmented reality display device in near-real-time based on a determination that a user is authorized to access the data. An exemplary process for decrypting data to be displayed on an augmented reality display device in near-real-time based on a determination that a user is authorized to access the data is generally indicated at flowchart 400 in FIG. 4.

Figure 4:
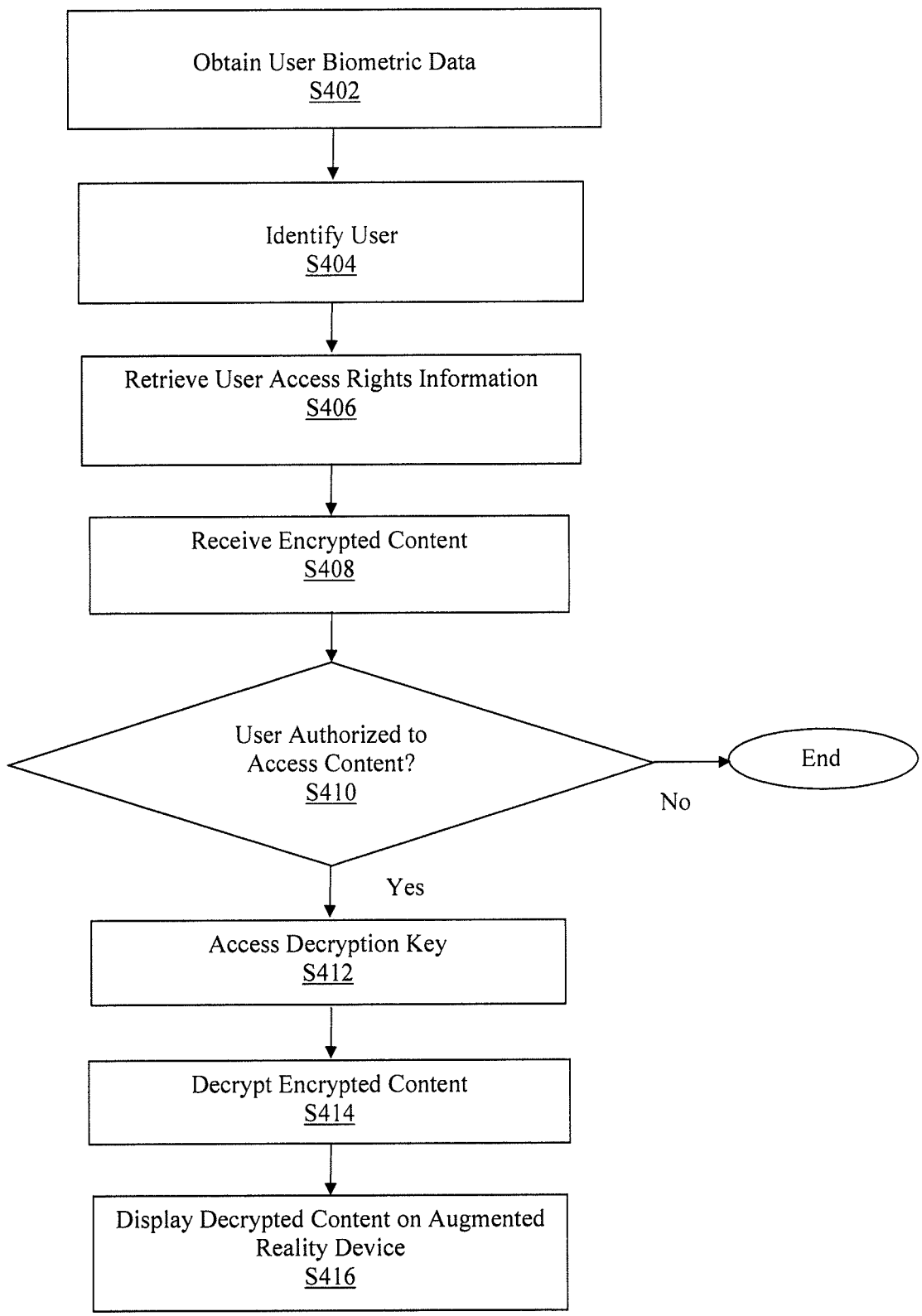
FIG. 4 is a flowchart of an exemplary process for implementing a method for decrypting data to be displayed on an augmented reality display device in near-real-time based on a determination that a user is authorized to access the data.

In the process 400 of FIG. 4, at step S402, biometric data that relates to the user is obtained, and at step S404, the biometric data is used to identify the user. In an exemplary embodiment, the biometric data may be obtained by performing any one or more of scanning a retina of the user, recording voice data that is provided by the user, and/or obtaining fingerprint data that is provided by the user. In an exemplary embodiment, when voice data of the user is obtained, a voice recognition technique may be used to identify the user.

At step S406, the augmented reality data decryption module 302 retrieves access rights information that relates to the user. In an exemplary embodiment, the access rights information is stored in access management database 206(1) and includes security-related information that indicates whether a particular user is authorized to access certain information.

At step S408, encrypted content is received by the augmented reality data decryption module 302. In an exemplary embodiment, the encrypted content includes at least one of an encrypted document, an encrypted image, and encrypted streaming video data.

At step S410, the augmented reality data decryption module 302 makes a determination as to whether the user is authorized to access the encrypted content. In an exemplary embodiment, the encrypted content includes coded information, such as, for example, a scannable bar code and/or a Quick Response (QR) code, and the augmented reality data decryption module 302 reads the coded information and then uses this information in conjunction with the access rights information retrieved in step S406 to determine whether the user is authorized to access the content. If a determination is made that the user is not authorized (i.e., "No" result of step S410), then the method 400 ends, and the content is not decrypted and not displayed to the user.

If a determination is made that the user is authorized to access the encrypted content (i.e., "Yes" result of step S410), then at step S412, the augmented reality data decryption module 302 accesses a decryption key that is usable for decrypting the content. In an exemplary embodiment, the decryption key may be stored in the document and source system data repository 206(2).

At step S414, the encrypted content is decrypted by the augmented reality data decryption module 302, and then at step S416, the content is displayed on the augmented reality display device.

Figure 5:
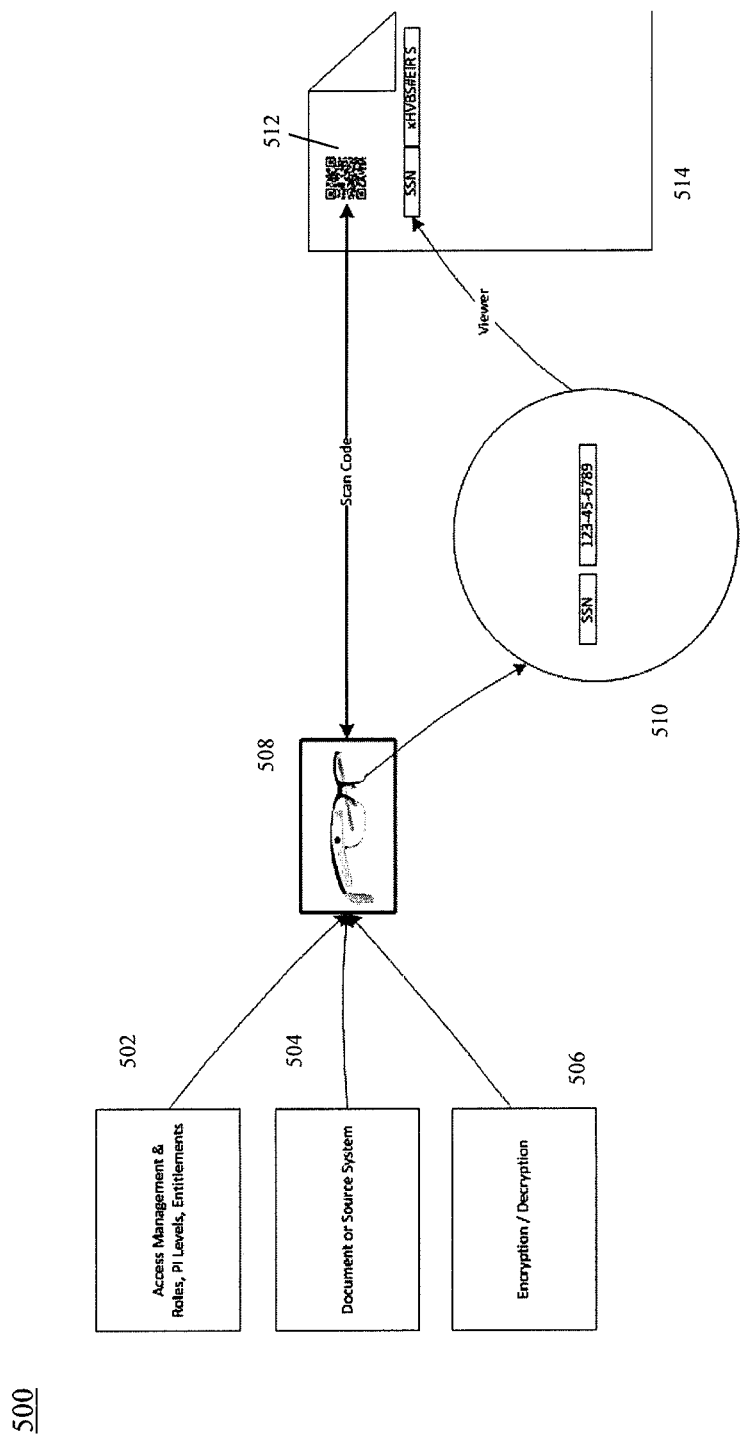
FIG. 5 is a block diagram that illustrates an interaction between an augmented reality display device and a decryption of encrypted data to be displayed thereon, according to an exemplary embodiment.

FIG. 5 is a block diagram 500 that illustrates an interaction between an augmented reality display device 508 and a decryption of encrypted data 514 to be displayed thereon, according to an exemplary embodiment. As illustrated in FIG. 5, the augmented reality display device 508 may be implemented as an optical head-mounted display device that is designed in the shape of eyeglasses, and may include an integrated circuit that has a processor that performs the functions of the augmented reality data decryption module 302 as described above.

Referring also to FIG. 3, the augmented reality display device 508 may be in communication with an access management & roles, PI levels, and entitlements component 502 that is similar to the access management database 206(1); a document or source system component 504 that is similar to the document and source system data repository 206(2); and an encryption/decryption component 506 that may store one or more encryption algorithms and one or more decryption keys. In an exemplary embodiment, the augmented reality display device 508 may be configured to perform a retinal scan with respect to the eyes of the user in order to obtain identification information, and then to use information that is stored in the access management & roles, PI levels, and entitlements component 502 to process the identification information obtained from the retinal scan to authenticate the user.

When encrypted content 514 is received by the augmented reality display device 508, the encrypted content 514 may include a scannable QR code 512, and the processor that is embedded in the augmented reality display device 508 may scan the QR code in order to obtain information that is usable for determining whether the user of the augmented reality display device 508 is authorized to access the encrypted content. The embedded processor may then use this information in conjunction with user-specific access rights information that is retrieved from the access management component 502 to make this determination, and then, if a positive determination is made, a decryption key may be retrieved from the encryption/decryption component 506. The encrypted content is then decrypted and displayed to the user, as illustrated at item 510.

Accordingly, with this technology, an optimized process for decrypting data to be displayed on an augmented reality display device in near-real-time based on a determination that a user is authorized to access the data is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing data decryption, the method being implemented by at least one processor that is in communication with an augmented reality display device attached to a head of a user, the method comprising:
    obtaining, by a first camera affixed to the augmented reality display device, biometric data including a retinal scan of the user when the user wears the augmented reality display device;
    determining, by the at least one processor and based on the biometric data, an identity of the user of the augmented reality display device;
    obtaining, by the at least one processor, access rights information corresponding to the identity of the user;
    scanning, by a second camera affixed to the augmented reality display device, a set of encrypted information provided on a document displayed on a screen affixed to the augmented reality display device for accessing coded information included in the set of encrypted information;
    determining, by the at least one processor, a first portion of the set of encrypted information the user is authorized to access and a second portion of the set of encrypted information that the user is not authorized to access based on whether the coded information correspond to a level indicated in the obtained access rights information;
    when the user is determined to be authorized to access the first portion:
        scanning, by the second camera, a QR code displayed on the document;
        extracting, by the processor, a URL from the scanned QR code;
        retrieving a decryption key by sending a message via a network corresponding to the URL to a centralized server;
        accessing, by the at least one processor, the decryption key corresponding to the level indicated in the obtained access rights information, the decryption key being stored in the centralized server, and the decryption key accessed being associated with the first portion,
        decrypting, by the at least one processor, the first portion while leaving the second portion in an encrypted state by using the decryption key accessed at the centralized server and based on the access rights information,
        and displaying on the screen, a plaintext corresponding to the decrypted first portion and an obfuscated text corresponding to the second portion remaining in the encrypted state.

2. The method of claim 1, wherein the obtaining the biometric data comprises obtaining voice data that relates to the user, and the using the obtained biometric data comprises using a voice recognition technique with respect to the obtained voice data.

3. The method of claim 1, wherein the obtaining the biometric data comprises obtaining fingerprint data that relates to the user.

4. The method of claim 1, further comprising scanning, by the at least one processor, bar code data that relates to the set of encrypted information, and using the scanned bar code data to identify the decryption key that is associated with the set of encrypted information.

5. The method of claim 4, wherein the bar code data comprises a Quick Response (QR) code.

6. The method of claim 1, wherein the set of encrypted information comprises image data that includes a code that is usable for determining whether the user is authorized to access a decrypted version of the image data.

7. The method of claim 1, wherein the set of encrypted information comprises streaming video data that includes a code that is usable for determining whether the user is authorized to access a decrypted version of the streaming video data.

8. A computing apparatus configured to implement an execution of a method for performing data decryption upon data to be displayed on an augmented reality display device attached to a head of a user, the computing apparatus comprising: a processor; a memory, a screen, a first camera, a second camera; and a communication interface coupled to each of the processor and the memory, wherein the augmented reality display device is configured to:
- obtain, by a first camera affixed to the augmented reality display device, biometric data including a retinal scan of the user when the user wears the augmented reality display device;
- determine, based on the biometric data, an identity of the user of the augmented reality display device:
- obtain access rights information corresponding to the identity of the user;
- scan, by a second camera affixed to the augmented reality display device, a set of encrypted information provided on a document displayed on the screen affixed to the augmented reality display device for accessing coded information included in the set of encrypted information;
- determine a first portion of the set of encrypted information the user is authorized to access and a second portion of the set of encrypted information that the user is not authorized to access based on whether the coded information correspond to a level indicated in the obtained access rights information;
- when the user is determined to be authorized to access the first portion:
  - scan, by the second camera, a QR code displayed on the document;
  - extract a URL from the scanned QR code;
  - retrieve a decryption key by sending a message via the communications interface over a network corresponding to the URL to a centralized server;
  - access the decryption key corresponding to the level indicated in the obtained access rights information, the decryption key being stored in the centralized server, and the decryption key accessed being associated with the first portion,
  - decrypt the first portion while leaving the second portion in an encrypted state by using the decryption key accessed at the centralized server and based on the access rights information,
  - and display on the screen, a plain text corresponding to the decrypted first portion and an obfuscated text corresponding to the second portion remaining in the encrypted state.

9. The computing apparatus of claim 8, wherein the processor is further configured to obtain voice data that relates to the user and to use a voice recognition technique with respect to the obtained voice data to identify the user.

10. The computing apparatus of claim 8, wherein the processor is further configured to obtain fingerprint data that relates to the user.

11. The computing apparatus of claim 8, wherein the processor is further configured to scan bar code data that relates to the set of encrypted information and to use the scanned bar code data to identify the decryption key that is associated with the set of encrypted information.

12. The computing apparatus of claim 11, wherein the bar code data comprises a Quick Response (QR) code.

13. The computing apparatus of claim 8, wherein the set of encrypted information comprises image data that includes a code that is usable for determining whether the user is authorized to access a decrypted version of the image data.

14. The computing apparatus of claim 8, wherein the set of encrypted information comprises streaming video data that includes a code that is usable for determining whether the user is authorized to access a decrypted version of the streaming video data.

* * * * *